(12) United States Patent
Berto et al.

(10) Patent No.: US 6,644,862 B1
(45) Date of Patent: Nov. 11, 2003

(54) OPTICAL MOUNT

(75) Inventors: Thomas Edward Berto, Santa Rosa, CA (US); Scott Alan Robertson, Sebastopol, CA (US)

(73) Assignee: Agilent Technolgies, Inc., Palo Alto, CA (US)

( * ) Notice: Subject to any disclaimer, the term of this patent is extended or adjusted under 35 U.S.C. 154(b) by 0 days.

(21) Appl. No.: 10/254,160

(22) Filed: Sep. 25, 2002

(51) Int. Cl.[7] .............................. G02B 6/00; G02B 6/36; G02B 6/42
(52) U.S. Cl. ............................. 385/53; 385/90; 385/137
(58) Field of Search .............................. 385/49, 52, 53, 385/88, 90, 134, 136, 137

(56) References Cited

U.S. PATENT DOCUMENTS

| 4,491,294 A | * | 1/1985 | Blume et al. ............... 385/134 |
| 6,414,785 B1 | | 7/2002 | Berto et al. |

FOREIGN PATENT DOCUMENTS

| FR | 2681951 | * 4/1993 | ............ G02B/6/42 |

* cited by examiner

*Primary Examiner*—Hemang Sanghavi
*Assistant Examiner*—Omar Rojas

(57) ABSTRACT

An optical mount has a frame and a barrel moveably positioned within the frame, the barrel including an optical connector housing optical wave-guide. The optical connector is mounted within the barrel at a mount angle, the optical connector having an end face polished at a polish angle relative to the axis of the optical connector. The frame has two angled contact surfaces symmetric relative to each other across a plane of symmetry, a leaf spring having an end adapted to maintain contact with the barrel along a plane of symmetry. The barrel is axially and rotationally moveable within the frame allowing for precise positioning of the optical wave-guide relative to the frame thereby minimizing polarization dependent loss (PDL). A focus tool having an offset eccentric pin can be used with a circumferential groove of the barrel to allow for precise axial movements of the barrel within the frame.

7 Claims, 4 Drawing Sheets

OPTICAL MOUNT

BACKGROUND

The performance of optical systems often depends on the precision with which optical elements within the systems can be mounted and positioned. For example, to realize performance benefits of single-mode fibers in an optical system, wave-guides need be mounted and positioned with high precision to maximize optical signal power transfer and to minimize various losses including, but not limited to, polarization dependent loss (PDL) while not allowing a reflected signal to adversely effect the rest of the optical system. There is a need for a precision mount and positioning system for optical elements to minimize the PDL yet avoid reflected signal adversely effect the rest of the optical system.

SUMMARY

The need is met by the present invention. According to one aspect of the present invention, an optical mount includes a frame defining a through hole, a barrel movably positioned within the through hole, and an optical connector mounted within the barrel at a mount angle, the optical connector having an end face polished at a polish angle relative to the axis of the optical connector. The frame has two angled contact surfaces symmetric relative to each other across a plane of symmetry, a leaf spring having an end adapted to maintain contact with the barrel along the plane of symmetry. The frame further defines a threaded hole adapted to receive a set screw and a focus access hole along the plane of symmetry adapted to receive a focus tool.

According to another aspect of the present invention, an optical mount includes an optical connector with an end face polished at a polish angle relative to the axis of the optical connector, a barrel providing an angled mount means for the optical connector, the barrel defining a circumferential groove, and a frame with a through hole providing movable positioning of the barrel by means of two angled contact surfaces for the barrel with a plane of symmetry and a focus access hole along the plane of symmetry. Further, the optical connector includes a leaf spring having an end adapted to maintain contact with the barrel along the plane of symmetry, a threaded hole adapted to receive a set screw, and a focus tool comprising a rod adapted to fit in focus access hole of the frame with an offset eccentric pin adapted to fit in the circumferential groove of the barrel.

According to yet another aspect of the present invention, an optical mount includes a frame defining a through hole, a barrel movably positioned within the through hole, and an optical connector mounted within the barrel at a mount angle, the optical connector having an end face polished at a polish angle relative to the axis of the optical connector. The frame includes two angled contact surfaces symmetric relative to each other across a plane of symmetry and defines a threaded hole adapted to receive a set screw and a focus access hole along the plane of symmetry adapted to receive a focus tool. The focus tool includes threaded sleeve, a compression spring, a plunger, and an offset eccentric pin adapted to fit in a circumferential groove of the barrel.

Other aspects and advantages of the present invention will become apparent from the following detailed description, taken in combination with the accompanying drawings, illustrating by way of example the principles of the invention.

DETAILED DESCRIPTION

One embodiment of the present invention is an optical mount including a frame, a barrel, and an optical connector. The barrel is movably positioned within the frame and the optical connector is mounted within the barrel. The optical connector includes wave-guide such as optical fiber. The barrel, thus the optical connector, can be moved, axially and rotationally, with respect to the frame. Therefore, the optical connector can be precisely positioned to maximize optical signal transfer from a signal source into the wave-guide.

Figure 1:
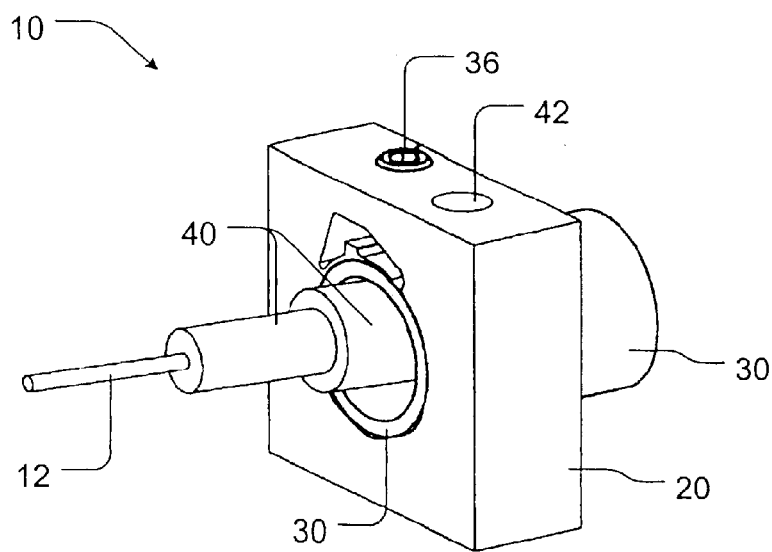
FIG. 1 shows a perspective view of an optical mount constructed according to one embodiment of the present invention.
Figure 2:
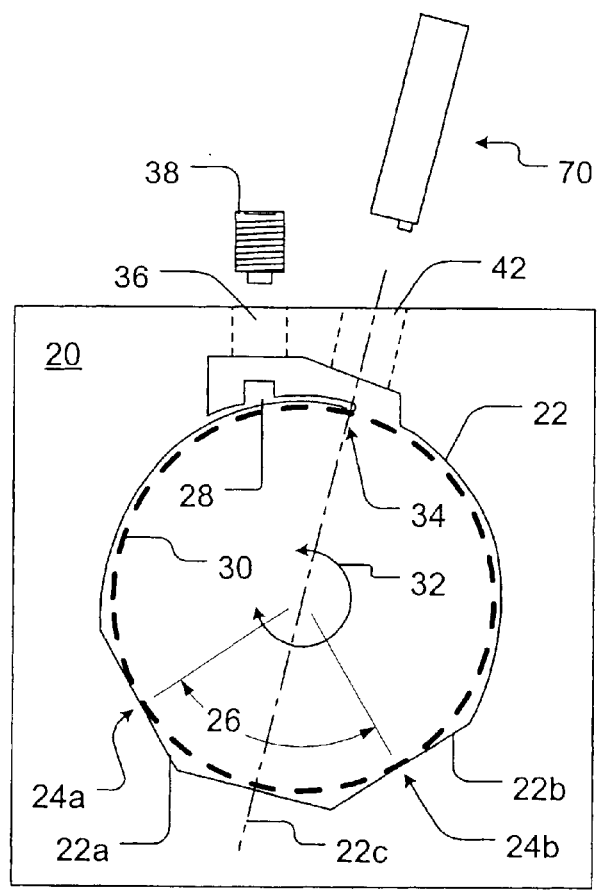
FIG. 2 shows a rear view of portions of the optical mount of FIG. 1 with additional components.

FIG. 1 is hows a perspective view, viewed from a rear side angle, of an optical mount 10 constructed according to one embodiment of the present invention. The mount 10 includes a frame 20, a barrel 30 movably positioned within the frame 20, and an optical connector 40 mounted within the barrel 30. Further, the optical connector 40 carries, within the connector 40, a wave-guide 12 such as optical fiber 12. FIG. 2 shows a rear view of portions of the optical mount 10 of FIG. 1 with additional components. Referring to FIGS. 1 and 2, the frame 20 defines a semi-polygonal through hole 22 adapted to receive the barrel 30; t he barrel 30 having generally a cylindrical shape. In FIG. 1, for convenience, the frame 20 is illustrated having generally a rectangular parallelepiped shaped. However, the frame can have alternative shapes depending upon its surrounding environment, application, or both. In FIG. 2, the barrel 30 is illustrated in a cross-sectional view using a dashed circle 30.

In the illustrated embodiment, the through hole 22 is illustrated as having a semi-octagonal cross section with edges 22a and 22b defining surfaces 22a and 22b in the three dimensional frame 20. Surfaces 22a and 22b are symmetric relative to each other across a plane of symmetry 22c. The through hole 22 can have portions, or edges, having other shapes such as arc-shaped. The surfaces 22a. and 22b provides barrel contact surfaces for the cylindrically shaped barrel 30 allowing the barrel to move, rotationally, around its axis as illustrated by a bi-directional rotational arrow 32. The contact points between the barrel 30 and the surfaces 22a and 22b of the frame 20 are indicated by references 24a and 24b, respectively. The barrel contact surfaces 22a and 22b are at a support angle 26 relative to each other. The support angle: 26 can be, for example, ninety degrees.

The frame 20 includes a leaf spring 28 having an end 34. The leaf spring 28 is adapted such that the end 34 (also the "contact point 34") maintains contact with the barrel 30 along the plane of symmetry 22c at a slight pressure, or tension, while allowing the barrel 30 to be moved within the through hole 22. The frame 20 defines a threaded hole 36 adapted to receive a setscrew 38. When the barrel 30 is placed within the through hole 22 in the desired position, the set screw 38 is applied against the spring 28 to tighten the spring 28 against the barrel 30 thereby fastening the barrel 30 at the desired position.

The barrel contact surfaces 22a and 22b are symmetrically positioned relative to each other across a plane 22c of symmetry that also intersects the contact point 34 of the leaf spring and the through hole 42 for the focus tool 70. This design provides desired stability of the barrel 30 within the frame 20.

Figure 3:
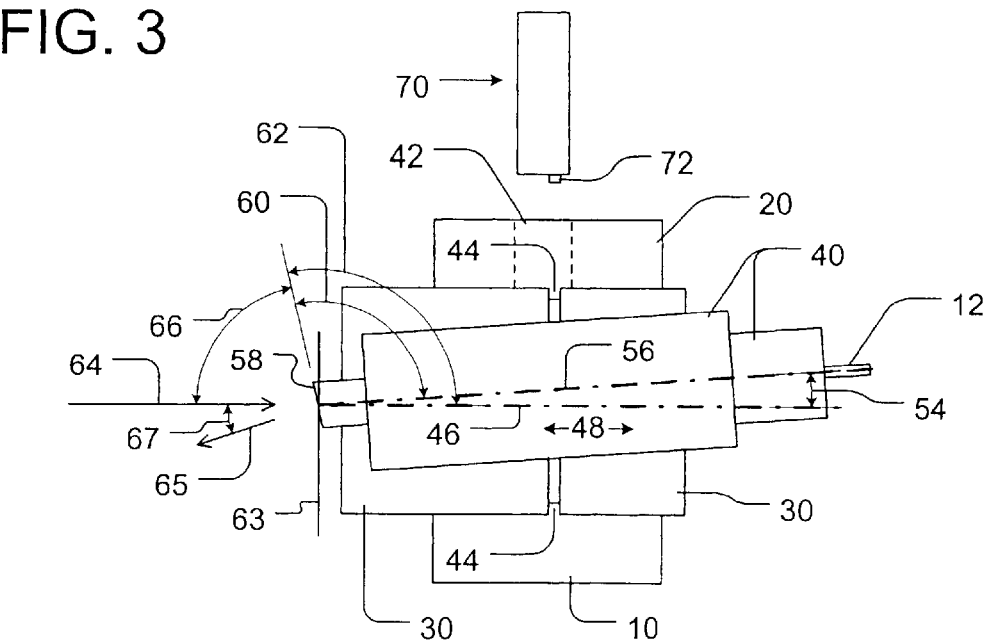
FIG. 3 shows a cut-away side view of the optical mount of FIG. 1.

Additional features of the optical mount 10 are illustrated in FIG. 3. FIG. 3 shows a cut-away side view of the optical mount of FIG. 1. Referring mostly to FIG. 3 but also referring to FIGS. 1 and 2, the frame 20 defines a radial access hole 42 adapted to receive a focus tool 70 along the plane of symmetry 22c. The focus tool 70 has an offset eccentric pin 72 adapted to engage a circumferential groove 44 defined by the barrel 30.

The focus tool 70 can be inserted in the radial access hole 42 and rotated such that the pin 72 at the tip engages in the circumferential groove 44 of the barrel 30. Then, rotating the focus tool 70 moves the pin 72 at the tip axially drawing the barrel back and forth by the same amount minus the clearance between the pin 72 and the groove 44. The movement is along the barrel's axis 46 ("barrel axis" indicated by dash-dot line 46) relative to the frame 20. A bi-directional arrow 48 illustrates the direction of the axial movement. When the barrel 30 is moved to the desired position relative to the frame 20, the barrel's axial location is fixed by tightening the setscrew 38.

The optical connector 40 is mounted within the barrel 30 at a mount angle 54 relative to the barrel axis 46. That is, axis 56 ("connector axis" indicated by dash-dash-dot line 56) of the optical connector 40 is at the mount angle 54 relative to the barrel axis 46. The mount angle 54 is typically less than ten degrees, and can be, for example, 3.7 degrees. In some implementations, the mount angle 54 can be zero degrees. That is, the barrel axis 46 and the connector axis 56 can be aligned.

The optical connector 40 has an end face 58 polished at a polish angle 60 relative to the connector axis 56. The polish angle 60 is typically more than 90 degrees, and can be, for example, 98 degrees. Accordingly, when the mount angle 54 and the polish angle 60 are aligned, the end face 58 of the connector 40 is, in the illustrated embodiment, 101.7 degrees relative to the barrel axis 46 as illustrated by reference angle 62. As illustrated, the polish angle 60 is 98 degrees relative to the connector axis 56, or eight degrees relative to a normal, or orthogonal, plane relative to the connector axis 56.

The optical fiber 12 spans the length of the connector 40 and terminates at the end face 58. Further, the terminal end (at the end face 58) of the optical fiber 12 is polished at the same angle as the end face 58 relative to the connector axis 56.

Accordingly, when optical signal (illustrated as a vector 64) is directed at the end face 58 along the direction of the barrel axis 46, the optical signal 64 encounters the optical fiber 12 at a supplementary angle 66. In the illustrated embodiment, the supplementary angle 66 is supplement to the reference angle 62 and is about 78.3 degrees (=180−101.7 degrees).

Because of the angled end face 58 of the optical connector 40, the transmissibility of the connector 40 varies with polarization, by an amount depending on the index of the wave-guide 12 and the angle of the interface to the incident or transmitted light. For an eight-degree polish angle (or 98 degrees relative to the connector axis 56), the variation in transmission between S and P polarized light is 0.019 dB. By rotating the barrel 30, this 0.019 dB variation can be used to add or subtract from the residual PDL (polarization dependent loss) of the rest of the system to which the mount 10 belongs. Different polish angles can be chosen such that the S-P transmission difference is larger or smaller—for example, a 10-degree polish angle (or 100 degrees relative to the connector axis 56) provides a 0.030 dB of difference.

Non-angled end faces have zero PDL, but the non-angled end face reflects a portion (for example four percent) of the optical signal 64 straight back toward the source of the optical signal 64. The reflected signal can interfere with the source of the optical signal 64 such as laser. Lasers, in particular, are a type of optical signal source that are sensitive to back reflections.

In the illustrated embodiment, the optical mount 10 the end face 58 is at 11.7 degrees relative to the normal plane 63 of the optical signal 64. This is because the end face 58 has an eight-degree polish angle relative to the connector axis 56 which, in turn, is at 3.7 degrees mount angle 54 relative to the barrel axis 46, and the optical signal 64 is aligned with the barrel axis 46. Accordingly, for the illustrated embodiment of the optical mount 10, reflected optical signal 65 is at a reflection angle 67 of 23.4 degrees (twice the 11.7 degrees) relative to the optical signal 64. Because the reflected optical signal 65 is at the reflection angle 67, the reflected optical signal 65 is not fed back to the source of the optical signal 64.

The mount angle 54 and the polish angle 60 can be chosen depending on various factors such as acceptable return loss rate, acceptable PDL, and manufacturing requirements. Return loss is the ratio of input power to reflected power.

In order to rotate the barrel, the focus tool 70 is installed in the circumferential groove 44 of the barrel 30, the locking set screw 38 is released, then the barrel 30 is rotated while holding the focus tool 70 without rotation. Focus is thus held constant while PDL is adjusted.

In the sample embodiment as illustrated in the Figures, the optical mount 10 is made of mostly metal, plastic, or other rigid material. Dimensions of the optical mount 10 are in the order of millimeters (mm) or less. In practice, the dimensions of the optical mount 10 can vary significantly depending upon application and its environment.

Figure 4A:
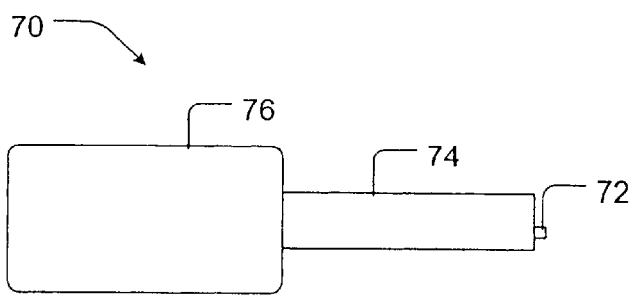
FIGS. 4A and 4B show a focus tool according to one embodiment of the present invention.
Figure 4B:
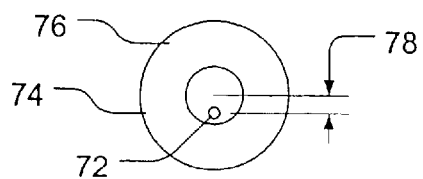

FIGS. 4A is a side view of the focus tool 70 according to one embodiment of the present invention. FIG. 4B is a front view of the focus tool 70 of FIG. 4A. The focus tool 70 is generally cylindrical in shape and has a rod 74 adapted to be inserted into the radial access hole 42 of FIGS. 2 and 3. The focus tool 70 includes the eccentric pin 72 located at a tip of the rod 74. The eccentric pin 72 can have dimensions in the order of one mm or less. The eccentric pin 72 is offset from the axial center of the rod 72 by an offset distance 78. In experiments, offset distances of two mm or less have been used with success. Because of the offset, when the offset eccentric pin 72 is engaged to the circumferential groove 44 of FIG. 3, rotations of the focus tool 70 causes the barrel 30 to laterally move along the barrel axis 46 relative to the frame 20 as discussed above. The focus tool can include a handle 76 for ease of use, the handle 76 having a greater diameter than the rod 74.

Figure 5A:
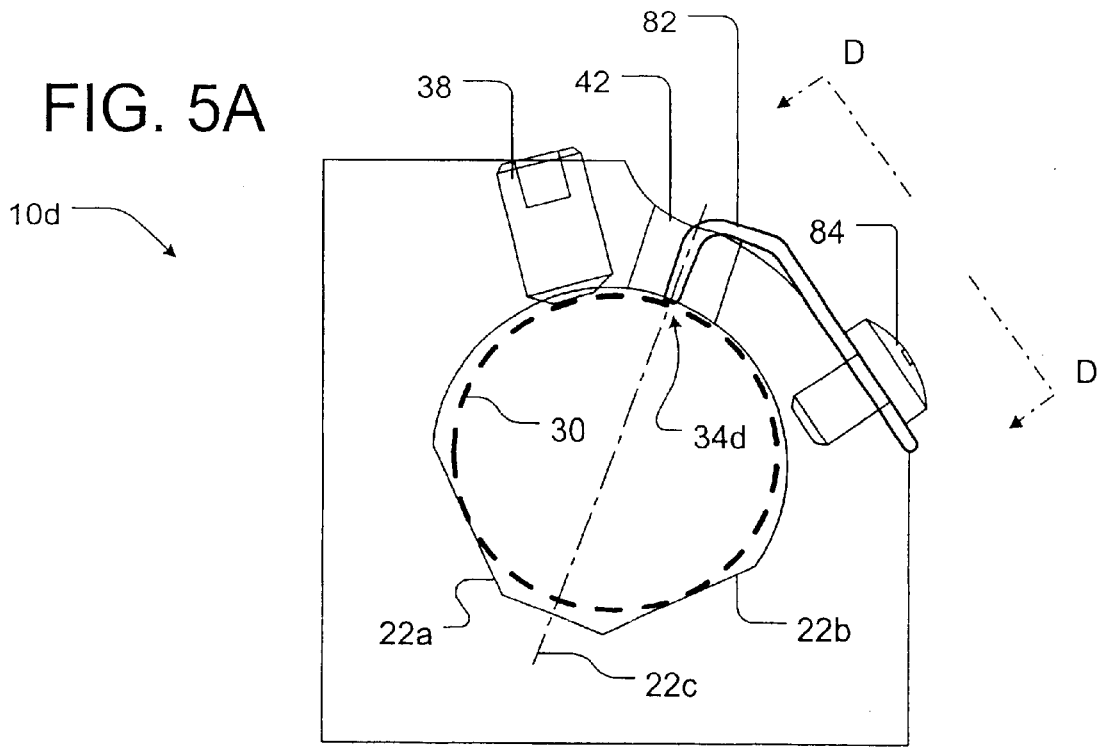
FIG. 5A shows a cutaway view of another embodiment of an optical mount according to the present invention.
Figure 5B:
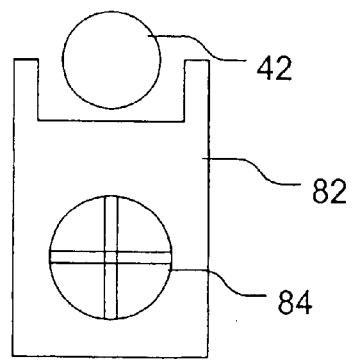
FIG. 5B shows a partial side view of the optical mount of FIG. 5A viewed from line D—D of FIG. 5A.

Another embodiment of the present invention having certain alternate configuration is shown in FIGS. 5A and 5B. Portions of this embodiment are similar to those shown in the previous Figures. For convenience, portions in FIGS. 5A and 5B that are similar to portions in previous Figures are assigned the same reference numerals, analogous but changed portions are assigned the same reference numerals accompanied by letter "d," and different portions are assigned different reference numerals. FIG. 5A shows a cutaway view of the alternative embodiment of an optical mount 10d. FIG. 5B shows a partial side view of the optical mount 10d of FIG. 5A viewed from line D—D of FIG. 5A.

Referring to FIGS. 5A and 5B, in the optical mount 10d according to an alternative embodiment of the present invention, a forked leaf spring 82 is used to provide the slight pressure against the barrel 30 at the contact point 34d. The contact point 34d is on the plane 22c of symmetry opposite the barrel contact surfaces 22a and 22b. The forked leaf spring 82 is attached to the optical mount 10d using a forked leaf spring screw 84. The forked leaf spring 82 is forked so that a focus tool can pass through the through hole 42 between the forked portions of the forked leaf spring 82. Here, the setscrew 38, when tightened, bears directly on the barrel 30.

Figure 6A:
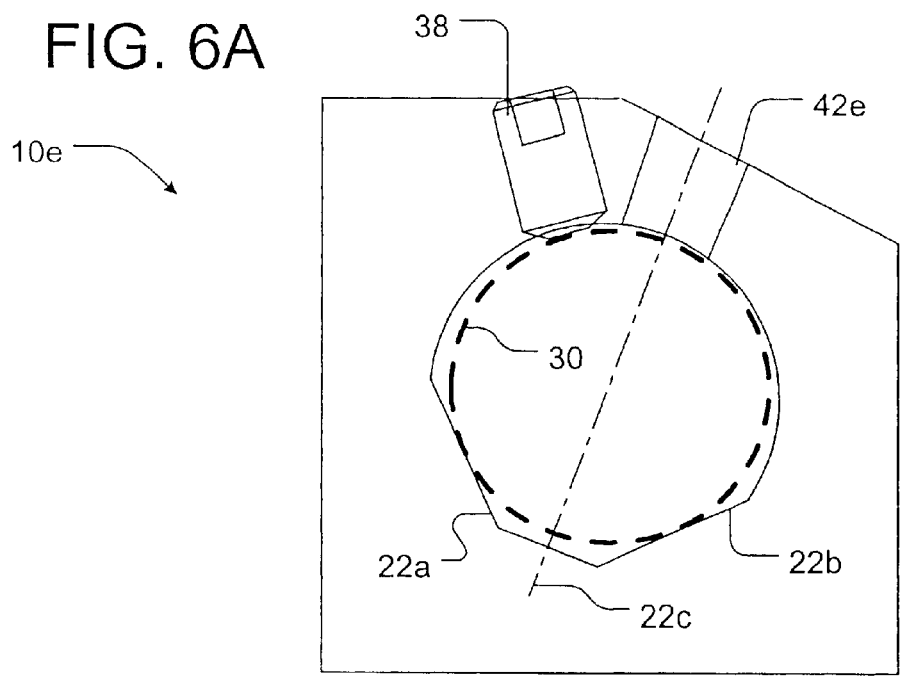
FIG. 6A shows a cutaway view of yet another embodiment of an optical mount according to the present invention.
Figure 6B:
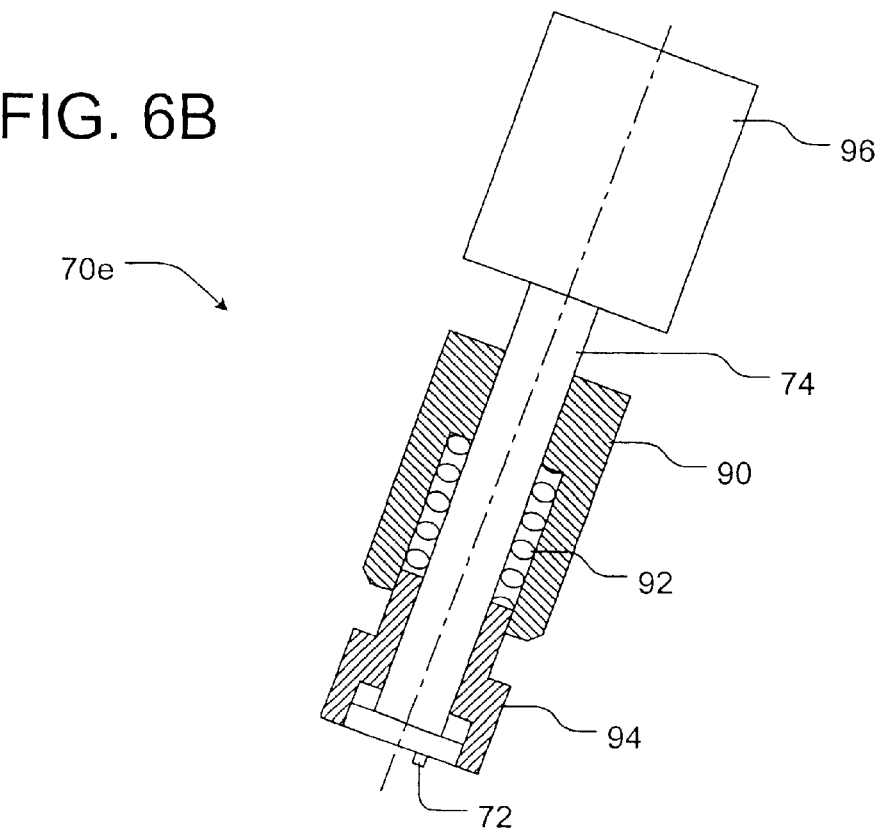
FIG. 6B shows a cutaway view of a focus tool adapted to operate with the optical mount of FIG. 6A.

Yet another embodiment of the present invention having certain alternate configuration is shown in FIGS. 6A and 6B. Portions of this embodiment are similar to those shown in the previous Figures. For convenience, portions in FIGS. 6A and 6B that are similar to portions in the previous Figures are assigned the same reference numerals, analogous but changed portions are assigned the same reference numerals accompanied by letter "e," and different portions are assigned different reference numerals. FIG. 6A shows a cutaway view of yet another alternative embodiment of. an optical mount 10e. FIG. 6B shows a cutaway view of a focus tool 70e adapted to operate with the optical mount 10e of FIG. 6A.

Referring to FIGS. 6A and 6B, the optical mount 10e includes a bored and threaded through hole 42e but lacks spring to pressure the barrel 30 onto the barrel contact surfaces 22a and 22b. The bored and threaded through hole 42e is adapted to receive the focus tool 70e having a threaded sleeve 90. The focus tool 70e is threaded, or screwed, into the bored and threaded through hole 42e until the eccentric pin 72 engages the circumferential groove 44 (shown in FIG. 3) of the barrel 30 at a slight pressure. The pressure is regulated by compression spring 92 that applies force, when the focus tool 70e is placed within the bored and threaded through hole 42e. The compression spring 92, when compressed, applies pressure against a plunger 94 inside which shaft 74 and eccentric pin 72 rotate. The focus tool 70e also includes a handle 96 for ease of use.

From the foregoing, it will be appreciated that the present invention is novel and offers advantages over the current art. Although a specific embodiment of the invention is described and illustrated above, the invention is not to be limited to the specific forms or arrangements of parts so described and illustrated. The invention is limited by the claims that follow.

What is claimed is:

1. An optical mount comprising:
   a frame defining a through hole;
   a barrel movably positioned within said through hole;
   an optical connector mounted within said barrel at a mount angle, said optical connector having an end face polished at a polish angle relative to the axis of said optical connector;
   said frame comprising:
      two angled contact surfaces symmetric relative to each other across a plane of symmetry;
      a leaf spring having an end adapted to maintain contact with said barrel along the plane of symmetry; and
   said frame further defining a threaded hole adapted to receive a set screw and a focus access hole along the plane of symmetry adapted to receive a focus tool.

2. The mount recited in claim 1 further comprising a focus tool having a rod adapted to fit in said focus access hole, said focus tool further including an offset eccentric pin adapted to fit in a circumferential groove of said barrel.

3. The mount recited in claim 1 further wherein said leaf spring is a forked leaf spring having an end adapted to maintain contact with said barrel along the plane of symmetry.

4. The mount recited in claim 3 further comprising a focus tool having a rod adapted to fit in said focus access hole, said focus tool further including an offset eccentric pin adapted to fit in a circumferential groove of said barrel.

5. An optical mount comprising:
   an optical connector with an end face polished at a polish angle relative to the axis of said optical connector;
   a barrel providing an angled mount means for said optical connector, said barrel defining a circumferential groove;
   a frame with a through hole providing movable positioning of said barrel by means of two angled contact surfaces for said barrel with a plane of symmetry and a focus access hole along the plane of symmetry;
   a leaf spring having an end adapted to maintain contact with said barrel along the plane of symmetry;
   a threaded hole adapted to receive a set screw; and
   a focus tool comprising a rod adapted to fit in focus access hole of said frame with an offset eccentric pin adapted to fit in said circumferential groove of said barrel.

6. The mount recited in claim 5 further wherein said leaf spring is attached to said frame with a screw.

7. An optical mount comprising:
   a frame defining a through hole;
   a barrel movably positioned within said through hole;
   an optical connector mounted within said barrel at a mount angle, said optical connector having an end face polished at a polish angle relative to the axis of said optical connector;
   said frame comprising two angled contact surfaces symmetric relative to each other across a plane of symmetry;
   said frame further defining a threaded hole adapted to receive a set screw and a focus access hole along the plane of symmetry adapted to receive a focus tool, said focus tool comprising:
      threaded sleeve;
      a compression spring;
      a plunger; and
      an offset eccentric pin adapted to fit in a circumferential groove of said barrel.

* * * * *